(12) United States Patent
Boyd

(10) Patent No.: US 7,520,427 B2
(45) Date of Patent: Apr. 21, 2009

(54) METHOD OF OPERATING A TICKETING SYSTEM

(75) Inventor: Leslie Fergus Boyd, Surrey (GB)

(73) Assignee: British Airways PLC (GB)

( * ) Notice: Subject to any disclaimer, the term of this patent is extended or adjusted under 35 U.S.C. 154(b) by 0 days.

(21) Appl. No.: 11/282,478

(22) Filed: Nov. 21, 2005

(65) Prior Publication Data

US 2006/0081704 A1 Apr. 20, 2006

Related U.S. Application Data

(63) Continuation of application No. 10/258,063, filed as application No. PCT/GB01/01782 on Apr. 18, 2001, now abandoned.

(30) Foreign Application Priority Data

| Apr. 18, 2000 | (GB) | ................................. 0009599.2 |
| May 8, 2000 | (GB) | ................................. 0011085.8 |

(51) Int. Cl.
*G06K 5/00* (2006.01)
(52) U.S. Cl. ...................................... 235/382; 235/385
(58) Field of Classification Search ................. 235/382, 235/383, 385, 462.01, 462.45; 705/5, 26, 705/28
See application file for complete search history.

(56) References Cited

U.S. PATENT DOCUMENTS

| 5,189,287 | A | | 2/1993 | Parienti | |
| 5,513,264 | A | | 4/1996 | Wang et al. | |
| 5,789,732 | A | | 8/1998 | McQueen et al. | |
| 5,801,664 | A | * | 9/1998 | Seidensticker et al. | ....... 345/2.3 |
| 5,862,262 | A | * | 1/1999 | Jacobs et al. | ................. 382/249 |
| 5,939,699 | A | | 8/1999 | Reber et al. | |
| 6,082,620 | A | | 7/2000 | Bone, Jr. | |
| 6,125,281 | A | | 9/2000 | Huber et al. | |
| 6,223,166 | B1 | * | 4/2001 | Kay | ............................. 705/26 |
| 6,250,557 | B1 | * | 6/2001 | Forslund et al. | ............. 235/492 |
| 6,614,914 | B1 | * | 9/2003 | Rhoads et al. | .............. 382/100 |
| 6,736,322 | B2 | * | 5/2004 | Gobburu et al. | ......... 235/462.46 |
| 2002/0023027 | A1 | * | 2/2002 | Simonds | ....................... 705/26 |
| 2002/0195495 | A1 | * | 12/2002 | Melick et al. | ........... 235/462.01 |
| 2003/0066883 | A1 | * | 4/2003 | Yu | .............................. 235/382 |

FOREIGN PATENT DOCUMENTS

| DE | 19654859 | 12/1998 |
| DE | 19754384 | 6/1999 |
| DE | 19839178 | 3/2000 |
| EP | 713198 | 5/1996 |
| EP | 887 756 A2 | 12/1998 |

(Continued)

OTHER PUBLICATIONS

Haartsen, Jaap. The universal radio interface for ad hoc, wireless connectivity.

*Primary Examiner*—Daniel St.Cyr
(74) *Attorney, Agent, or Firm*—Sterne, Kessler, Goldstein & Fox P.L.L.C.

(57) ABSTRACT

A method of operating a ticketing system comprises generating data representing ticket information and transmitting the same for reception by a mobile station over a mobile communications network link. Data from the mobile station can then be used to verify a transaction.

15 Claims, 5 Drawing Sheets

FOREIGN PATENT DOCUMENTS

| | | |
|---|---|---|
| EP | 950 968 | 10/1999 |
| EP | 1030272 | 8/2000 |
| EP | 1103922 A2 | 5/2001 |
| GB | 2015221 A | 9/1979 |
| GB | 2362012 A | 11/2001 |
| KR | 2000000304 | 1/2000 |
| WO | WO 97/30556 | 8/1997 |
| WO | WO 98/47295 | 10/1998 |
| WO | WO 00/62260 | 10/2000 |
| WO | WO 01/63533 A2 | 8/2001 |

* cited by examiner

METHOD OF OPERATING A TICKETING SYSTEM

CROSS REFERENCE TO RELATED APPLICATIONS

This application claims priority to U.S. application Ser. No. 10/258,063, filed Mar. 21, 2003, now abandoned.

BACKGROUND OF THE INVENTION

This invention relates to a method of operating a ticketing system. In particular but not exclusively the invention relates to a method of operating a ticketing system for a transport service.

Ticketing and check-in procedures of public transport providers are on the whole, implemented with paper documentation. Using the example of an airline journey, a passenger either through a travel agent or the airline books and pays for a journey and is issued with a paper ticket and/or boarding pass as proof of carriage. The ticket/boarding pass contains information identifying the passenger and the journey. The information on the ticket/boarding pass is verified at the airport by an airline employee before the passenger is allowed to board the flight. Commonly, an airline employee using a computer, which is connected to a database on which the passenger's reservation details are stored, manually verifies the information on the ticket/boarding pass. There are several problems with this process. For instance, manual verification can be slow and hence inconvenient to the passenger. Furthermore, the process relies on pre-printed paper tickets, which are tedious to deal with, and prone to being lost.

Some effort has been made to automate the check-in procedure at airports. For instance, some airlines now issue tickets or boarding passes, which have ticket information, stored on a magnetic swipe strip. This information is verified at the airport pre-boarding by swiping the card through a swipe reader, which automatically reads the information on the strip. Whereas, the use of swipe strips and swipe readers does speed up the check-in process it is not without its disadvantages. In particular, swipe card readers and also the printers needed to print the ticket/boarding pass with the necessary swipe stripe are expensive to install and cumbersome to use.

SUMMARY OF THE INVENTION

The present invention aims to alleviate these problems.

According to the invention there is provided a method of operating a ticketing system for users, the method comprising: generating data which represents ticket information to allow said ticket data to be used by a user of the system; transmitting said ticket data such that said data is received by a mobile station over a mobile communications network link; receiving said ticket data from said user or from said mobile station; and using said ticket data received from said user or from said mobile station to verify a transaction with said user.

According to the invention there is also provided a method of operating a ticketing system for users, the method comprising: generating data which represents ticket information to allow said ticket data to be used by a user of the system; transmitting said ticket data such that said data is received by a computer over a communications network link, to allow said data to be written to a portable electronic device; receiving said ticket data from said portable electronic device; and using said ticket data received from said portable electronic device to verify a transaction with said user.

According to the invention there is also provided a method of using a mobile station as a ticket, the method comprising: receiving at said mobile station data transmitted over a mobile communications network, said data representing ticket information; and making said data received by said mobile station available for use in verifying a transaction.

According to the invention there is also provided apparatus for receiving data sent over a communications network, the apparatus comprising: means for receiving the data in a first presentation format, which is not specially adapted to be machine readable; means for converting the data from said first presentation format into a second presentation format which is specially adapted to be machine readable; and means for displaying data in said second presentation formation.

The above and further features of the invention are set forth with particularity in the appended claims and together with advantages thereof will become clearer from consideration of the following detailed description of exemplary embodiments of the invention given with reference to the accompanying drawings.

DETAILED DESCRIPTION OF THE INVENTION

Figure 1:
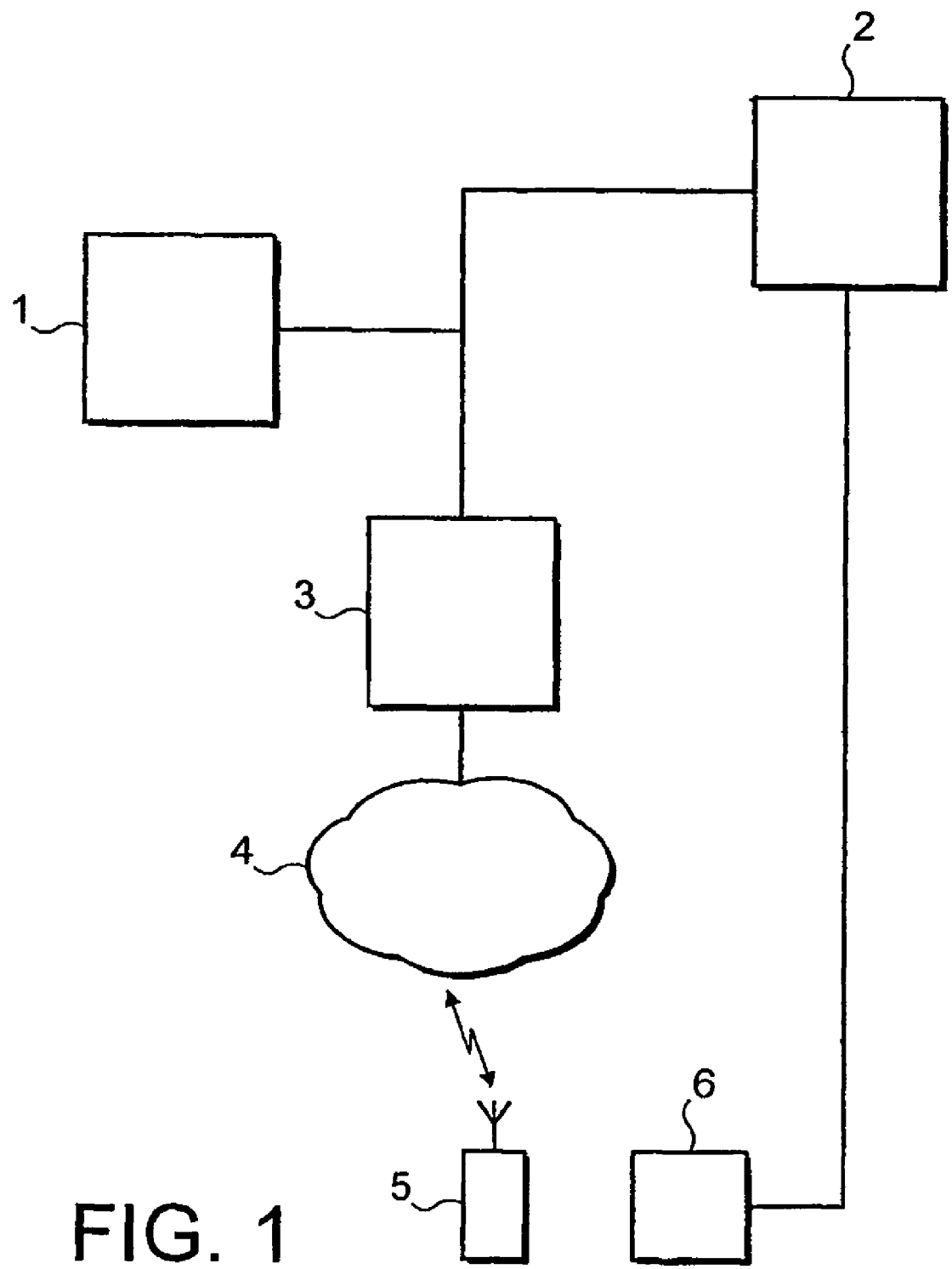
FIG. 1 is a block diagram schematically illustrating a system embodying the invention.

FIG. 1 is a schematic diagram of a system embodying the invention. For the purposes of illustration only, the embodiment is described with reference to an airline ticketing system.

A flight reservation centre 1 is connected to an airline computer system 2 and also to a message generator 3. Ticket details of a booking made for a passenger at the reservation centre 1 are stored on the computer system 2. Furthermore, a message containing the ticket details is generated by the message generator 3 and sent over communications link 4 to a mobile station 5 of a passenger. The mobile station 5 has a display screen (not illustrated) and is arranged to present the ticket details as an optical code, for example a bar-code on the screen, for scanning at the airport by an optical code reader 6 as part of the check-in procedure. The optical code reader 6 is connected to the computer system 2 and validates the ticket details read from the mobile station 5 by comparing the details with those stored on the computer system 2. If validation is successful the passenger is authorised to continue the journey.

The system will now be described in more detail.

A passenger wishing to reserve a flight does so by contacting the reservation centre 1. Typically, the flight reservation centre 1 is the booking centre of a particular airline or private company (e.g. a travel agency) acting for an airline. Reservations can be made in any number of standard ways, for example by attending the reservation centre 1 in person, by mail, by phone or over the Internet.

When a flight reservation is made, the reservation centre 1 creates a computer record containing the relevant booking details. For example, this record may comprise some or all the following information:
Customer name
Flight number
Departure airport and terminal
Departure time
Gate number
Seat allocation number
Destination airport/city
Arrival time.

The reservation centre 1 also creates for each booking a unique identification code commonly known in the airline industry as a Passenger Name Record (PNR) which can be used to identify and retrieve the computer record of the booking. As is known in the art each PNR is coded as a unique set of six alphanumeric characters for example, TQR 8LR.

Previously, in known booking systems, the PNR has been printed on the paper tickets or boarding passes issued to a passenger by the airline. As part of the check-in or boarding procedure at the airport, the PNR shown on the ticket or boarding pass is entered into the airline computer reservation system which then retrieves the computer record of the booking details associated with the PNR. The information from the computer record can then be checked against that shown on the ticket before the passenger is authorised to continue with the journey.

In this embodiment of the invention, rather than printing the PNR code onto a ticket or boarding pass with which a passenger is then issued the PNR code is sent direct to a mobile station 5 associated with the passenger. As will be described in more detail below the mobile station holding the PNR code can be used as an electronic ticket apparatus for the check-in and boarding procedures at the airport thereby negating the need for paper tickets.

Once created, the PNR relating to a booking and also the associated booking details are stored on the airline computer system 2. In addition to this, the PNR and preferably some or all of the associated booking details are sent to message generating unit 3 for transmission over the communications network 4 to the mobile station 5. For illustration purposes only the communications network 4 illustrated in FIG. 1 is a GSM (Global System for Mobile Communications) digital cellular radio network. To transmit the PNR code and the booking details to the mobile station 5 the short message service (SMS) data transfer mechanism is employed. The SMS data transfer mechanism is a data transfer teleservice defined in, inter alia, GSM Technical Specification 03.40.

The generating unit 3, preferably a suitably programmed computer system, is used to generate a correctly formatted SMS message including the PNR and any of the above mentioned booking details that are to be sent to the passenger with the PNR. The SMS message also comprises a header, or flag, which identifies the message as one, which contains booking or ticket information. Once generated the SMS message is sent over the communications network 4 to the destination address of the mobile station 5 of the passenger, the relevant mobile telephone number of the passenger having been provided to the reservation centre 1 at the time of the booking. The SMS message can be sent to the passenger at any time between the time of booking and the beginning of the check-in procedure at the airport. It is envisaged that the passenger will be able to contact the SMS generating means 3 and request that the message is sent at a time convenient to the passenger.

Figure 2:
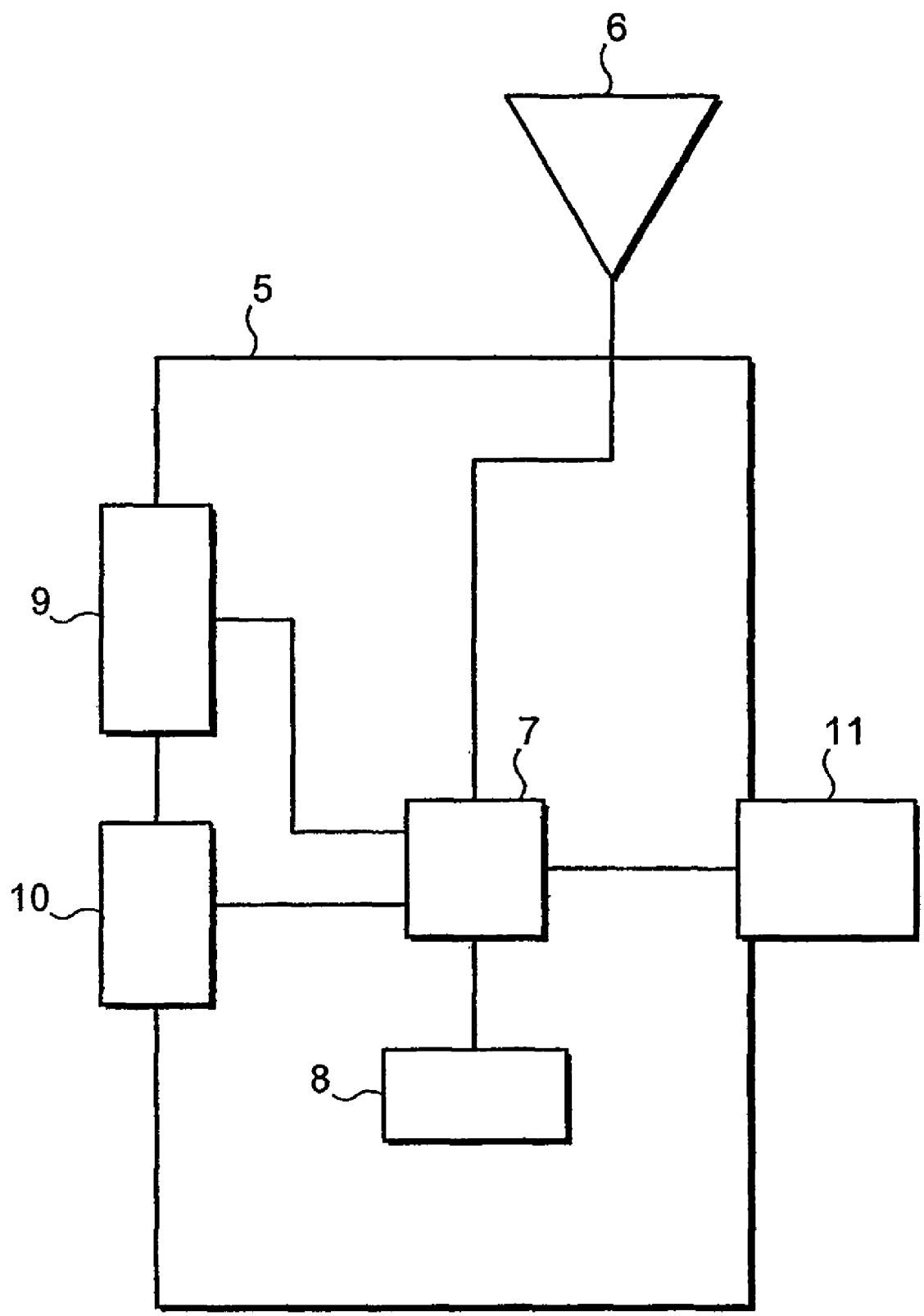
FIG. 2 is a block diagram schematically illustrating a telecommunications mobile station.

Referring to FIG. 2 of the accompanying drawings there is shown in more detail the mobile station 5 to which the SMS message is sent and which is arranged to process the message. Only those components of the mobile station 5 necessary to describe the invention are illustrated The mobile station 5 comprises a receive/transmit aerial 6, a processor circuit 7 for controlling the operation of the station 5, a memory 8 for storing data, a display 9 capable of displaying bit map images and an input device (keypad) 10.

The mobile station 5 is provided with a SIM 11 (Subscriber Identity Module). SIMs which contain the International Mobile Subscriber Identity (IMSI) and other such user information are well known in the art. The SIM 11 is further provided with a stored application program (e.g. a SIM application tool kit program) for processing SMS messages which contain ticket information, and controlling the displaying of such messages by the mobile station 5.

Figure 3:
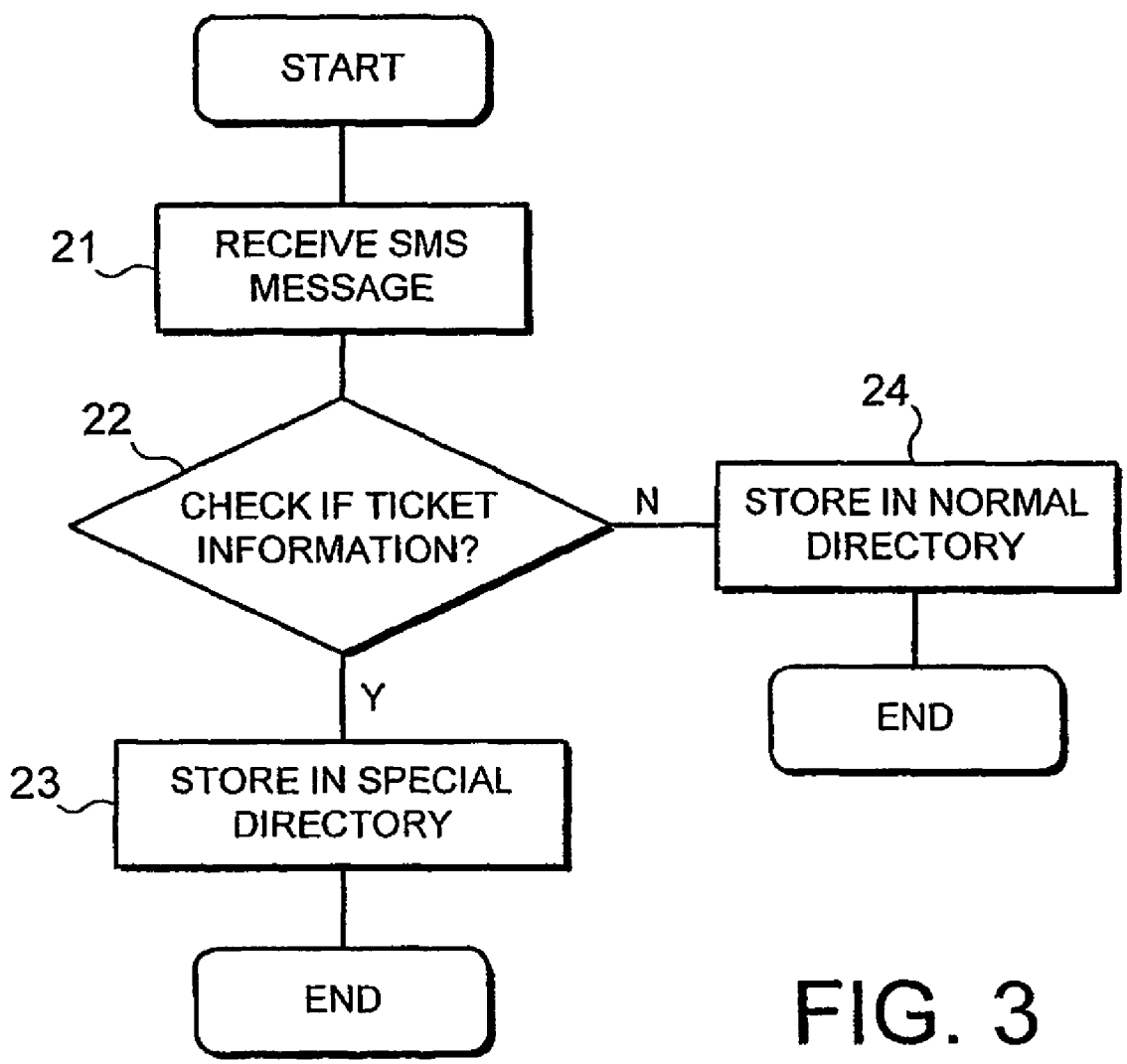
FIG. 3 is a flow diagram illustrating a procedure carried out in an embodiment of the present invention.

FIG. 3 illustrates a procedure carried out by the phone under the control of the application programme when receiving an SMS message containing ticket information. After the phone receives the SMS message the phone checks using the flag in the SMS message that the SMS message contains booking information, step 22. If the SMS message does contain booking information the message is stored in a special directory reserved for booking messages, which may be located either in the phone memory 8 or in memory provided on the SIM 11, step 23. Normal SMS messages not containing ticket information are stored in a normal SMS directory, step 24.

Figure 4:
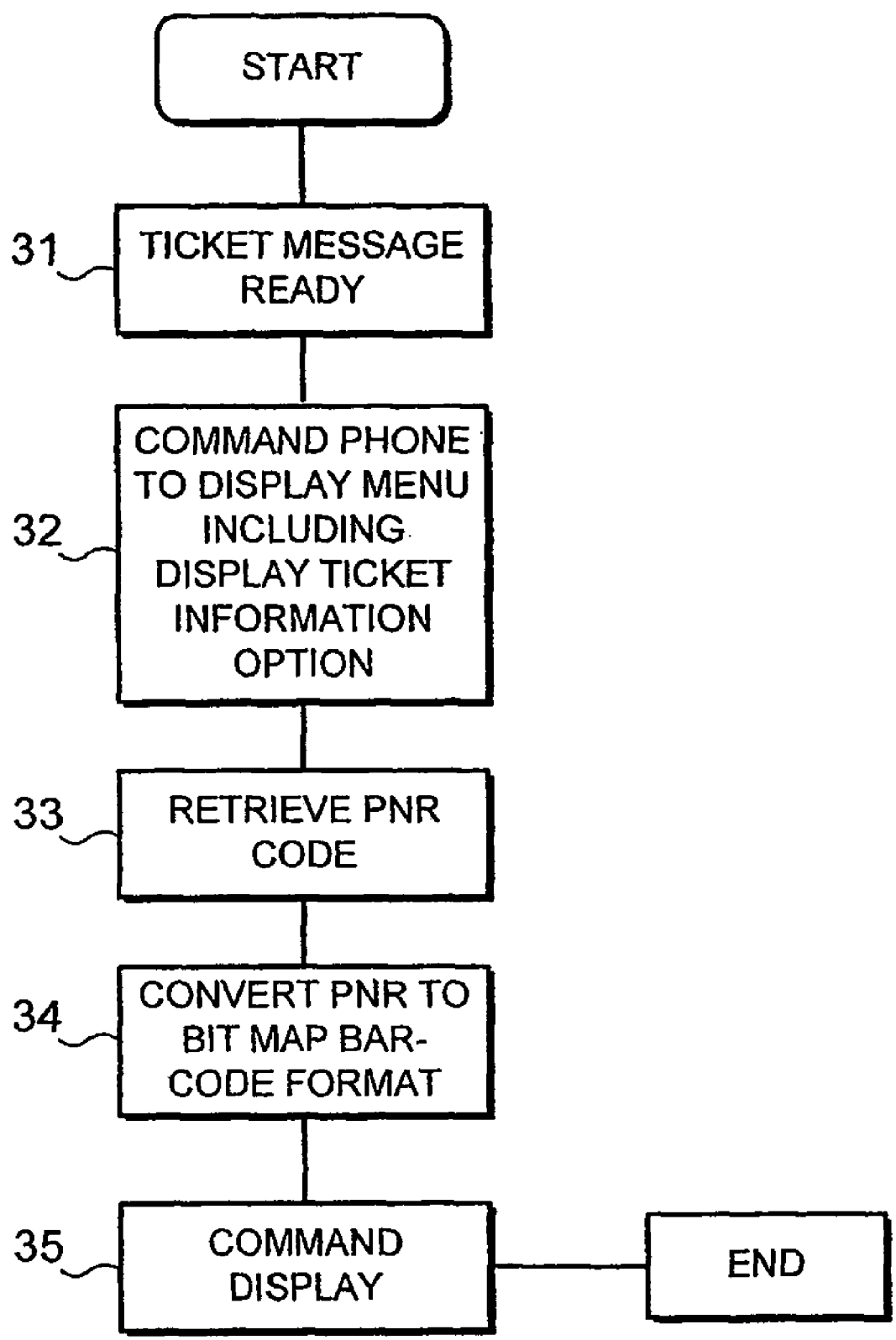
FIG. 4 is a flow diagram illustrating another procedure carried out in an embodiment of the present invention.

FIG. 4 illustrates a procedure by which the PNR code contained in the SMS message may be converted into an optical code format, for example a bar-code and displayed for verification on the mobile station's display 9. First, the passenger is prompted, for example by a particular icon on the display 9 of the mobile station 5 which indicates that an SMS ticket message is ready to be displayed, step 31.

The application programme is arranged to instruct the mobile phone to provide a selectable menu option including a display ticket information option step, 33 with which the passenger can request via the keypad 10 that the PNR code be displayed.

In response to this selection the application programme causes the PNR code to be retrieved from storage, step 33 and then converted, from the text format in which it is received by the mobile station 5 into a bit map bar-code format, step 34. Once the PNR code is converted into bar-code format the application programme commands the phone to display the optical code on the display screen 10, step 35. Referring back to FIG. 1, when the passenger wishes to check-in for or board a flight the PNR code is displayed as a bar-code on the mobile station's display thereby allowing a checking agent at the airport to perform the check-in procedure by scanning the bar-code with bar-code reader 6. Bar-code readers are known in the art and have the advantage of being reliable and relatively easy to use. The bar-code reader 6 is connected to the airline reservation computer 2 and if the PNR code read by the reader 6 is checked successfully against the relevant reservation details stored on the airline computer system 2 the passenger is allowed to continue the journey.

It can thus be seen that the check-in/boarding procedure is simplified, made quicker and generally more convenient both for the passenger and the airline. The need for the airline to issue paper documentation is reduced and conveniently all the ticket information required for the passenger to make the journey is held on the passenger's mobile station. In effect the mobile station acts as an electronic ticket device which provides proof of carriage for the passenger.

Figure 5A:
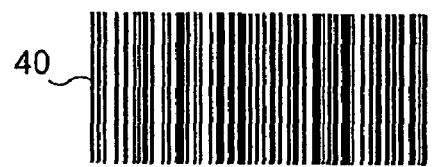
FIG. 5*a* is a diagram of a bar-code.
Figure 5B:
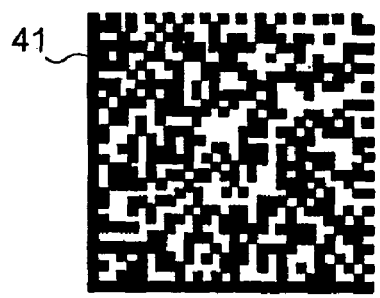
FIG. 5*b* is a diagram of a 2-D dot-code.

Two suitable optical code formats into which the PNR can be converted for display are illustrated in FIG. 5. Each of these optical codes has a presentation format which is specially adapted for reading by a machine (whereas other presentation formats, such as text, are not specially adapted in said manner). In FIG. 5a the optical code 40 is a standard bar-code. Such bar-codes can represent around 40 characters which is more than sufficient to be able to represent a 6 character PNR code. In FIG. 5b the optical code 41 is a 2-D dot-code. Such 2-D dot-codes are able to represent up to 2000 characters. Therefore, in addition to the PNR, the application programme may be arranged to encode in the optical code other ticket information contained in the original SMS message. In principle, all of the ticket information listed on page 4 may be included in the message and encoded for display in a 2-D dot-code such as the one illustrated in FIG. 5b.

Advantageously, the original SMS message may also include a hidden security code for encoding into the optical code to render counterfeiting of PNR optical codes more difficult.

Mobile phones having screen displays capable of displaying optical codes as bit map images with high enough resolution for reliable scanning are known, for instance, the Nokia 7110 which has a monochrome screen with a resolution of 96*65 pixels.

Figure 6:
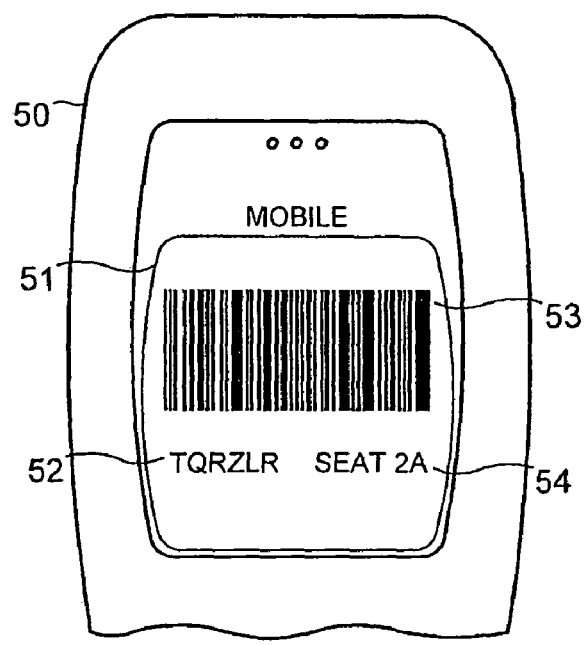
FIG. 6 is an illustration of a mobile station display screen.

In addition to converting the PNR code into optical code format and commanding the mobile station to display the optical code, the application programme may also perform other processes with the PNR code or any other booking information received in the SMS message. For instance, referring to FIG. 6 of the drawings, the application programme may be arranged to command the phone 50 to display on the screen 51 the PNR code in text format 52 as well as in bar-code format 53. Displaying the PNR in text format allows a checking agent to manually check the PNR in instances where the automatic reading of the optical code fails. Furthermore, the programme may be arranged to command the phone 50 to display as text any other booking information contained in the SMS message, for instance, the passenger's reserved seat number or the relevant flight number. As an example, the mobile station illustrated in FIG. 6 in addition to being instructed to display the PNR code in bar-code format 53 and the PNR in text format 52, the station has also been instructed to display in text the seat number 54 that has been allocated to the passenger.

It will be appreciated that the invention is not limited to embodiments in which the ticket information is sent to the mobile station as a text message using SMS. The message may also be sent in other message formats, for instance as a pager message. In a further embodiment (not illustrated) the ticket information is received by a mobile station using Wireless Application Protocol (WAP) technology. WAP enabled phones are known in the art and have a micro web browser capable of displaying specially written web pages downloaded to the station from a web site via a mobile communications network. In this embodiment, at the time or soon after the booking is made, the resultant PNR code and the booking information associated therewith are listed on a web page personal to the passenger and which is located on a secure web site co-ordinated by the airline. The passenger is provided with a password which allows access to the web page. When the passenger wishes to check-in at the airport the passenger launches the WAP browser of the mobile station and access's the personal web page. The passenger then selects to display the PNR code and if required the booking information associated with the PNR code. As with the embodiment described above the mobile station is arranged to display the PNR code as an optical code for reading by an optical code reader. In this embodiment the PNR code may be included in the web page in optical code format and received for display by the mobile station directly in this format. Alternatively, the PNR code may be received by the mobile station in text format and converted at the phone into optical code format for display. In an alternative arrangement the PNR and the associated booking details are sent to a computer associated with the passenger for example the passenger's home PC. The information may be sent to the computer in any number of known ways. For example, the details may be sent to the computer as an e-mail or alternatively the details may be listed on a secure web set to which the passenger is given access. Once stored on the computer the details are then downloaded on to the memory of a Digital Personal Assistant, a mobile station or any other portable electronic device that may be taken to the airport and which can present the ticket information in a manner that allows the information to be verified.

In the above-described embodiments the ticket information is displayed as a bar code or a dot-code. However, it is envisaged that alternative machine-readable formats in which the information may be displayed will be apparent to the skilled person.

Although in the above described embodiments the ticket information held on the mobile station or other such device is verified by means of an optical scanner, it is envisaged that other verification mechanisms may be employed. For example, at the airport the information may be transmitted from a mobile station or other device on which it is held to a suitable verification device by means of a communications cable, an infra-red link or a wireless radio-link for example using the so called Bluetooth universal radio interface. Advantageously if a radio interface such as Bluetooth is used for transmitting the ticket information from a mobile station (or other device) to the verification device then the mobile station and the verification device can be arranged so that the information is automatically transmitted in response to the mobile station being brought within a predetermined distance of the verification device. This obviates the need for user interaction and could for instance allow a user to pass a check-in point provided with a verification device without having to stop for the ticket information to be transmitted to the verification device.

Finally, although the invention has been described in detail with respect to a ticketing system for a transport service, it will be appreciated that the invention may also be used in respect of other activities that require ticket based authorisation, for example attending the theatre or attending sporting events.

Having thus described the present invention by reference to preferred embodiments, it is to be well understood that the embodiments in question are exemplary only and that modifications and variations such as will occur to those possessed of appropriate knowledge and skills may be made without departure from the spirit and scope of the invention as set forth in the appended claims and equivalents thereof.

The invention claimed is:

1. A method of operating a ticketing system for users, the method comprising:
    generating ticket data which represents ticket information to allow said ticket data to be used by a user of the system;
    transmitting said ticket data such that said ticket data is received by a mobile station over a mobile communications network link;

receiving said ticket data from said mobile station by reading said ticket data from a display on the mobile station using an optical reader; and using said ticket data read by said optical reader in verifying a transaction with said user;

wherein the ticket data is transmitted to said mobile station in a text message format comprising said ticket data and further information, and the further information is displayed for reading by the user.

2. A method according to claim 1, further comprising storing system data in said system corresponding to said ticket data, and subsequently accessing said system data when said ticket data is received from said mobile station via said optical reader.

3. A method according to claim 1, wherein the text message format further includes a header which indicates that the text message contains booking or ticket information.

4. A method according to claim 3, wherein the mobile station checks whether the header indicates that the text message contains booking or ticket information and if so, stores the. text message in a booking message directory distinct from a normal message directory.

5. A method according to claim 1, wherein the text message is an SMS message.

6. A method according to claim 1, wherein the optical reader is a bar-code or pin code reader.

7. A method according to claim 1, further comprising: storing the ticket data after generation in a storage device accessible via said mobile communications network; and transmitting the ticket data over the mobile communications network link on request.

8. A method according to claim 7, wherein the ticket data is transmitted to the user at a time requested by the user.

9. A method according to claim 1, comprising transmitting the ticket data over the mobile communications network link without request.

10. A method according to claim 1, wherein the ticket data is transmitted to said mobile station in one presentation format; and received by said optical reader in a second different presentation format.

11. A method according claim 1, wherein the ticket information relates to a transport service.

12. A method according to claim 11, wherein the ticket data is received from said mobile station via said optical reader at a location at which access to a transport service is provided.

13. A method according to claim 12, wherein said ticket data comprises electronic ticket information and check-in at an airport comprises said step of reading said ticket data from a display on the mobile station using an optical reader.

14. A method according to claim 12, wherein said ticket data defines a boarding pass for an aircraft flight.

15. A method according to claim 14, wherein said further information includes a seat number for the user on the aircraft flight.

\* \* \* \* \*